United States Patent

[11] 3,572,631

| [72] | Inventor | Stuart T. Ritchart |
| | | Burnsville, Minn. |
| [21] | Appl. No. | 810,512 |
| [22] | Filed | Mar. 26, 1969 |
| [45] | Patented | Mar. 30, 1971 |
| [73] | Assignee | Honeywell Inc. |
| | | Minneapolis, Minn. |

[54] MOTORIZED VALVE OF GLOBE-TYPE
5 Claims, 3 Drawing Figs.

[52] U.S. Cl. ............................................... 251/210,
137/454.6, 251/367
[51] Int. Cl. ............................................... F16k 1/00
[50] Field of Search........................................ 137/454.2;
251/210, 367; 137/404.6; 251/362

[56] References Cited
UNITED STATES PATENTS

| 1,180,108 | 4/1916 | Cash............................. | 137/454.2 |
| 1,925,392 | 9/1933 | LaBour ........................ | 137/454.2X |
| 3,034,761 | 5/1962 | Janquart....................... | 251/210 |

FOREIGN PATENTS

| 1,067,386 | 10/1959 | Germany..................... | 137/454.2 |
| 272,055 | 2/1951 | Switzerland................. | 137/454.2 |
| 905,322 | 9/1962 | Great Britain............... | 251/362 |

*Primary Examiner*—Harold W. Weakley
*Attorneys*—Lamont B. Koontz, Francis A. Sirr and Alan M. Staubly ABSTRACT: A motorized valve having a combined valve seat and valve assembly and a valve body having a side opening and an inclined peripheral shoulder between the inlet and outlet. Said assembly has a saddle or partition wall portion with a surface that engages said shoulder, with sealing means therebetween, and an integral motor-supporting portion that closes the opening in the valve body. The saddle has a smooth bore therethrough and a smooth surface around the inlet end of the bore and the valve has a piston portion and a disc portion for sequentially engaging said bore and surface, respectively.

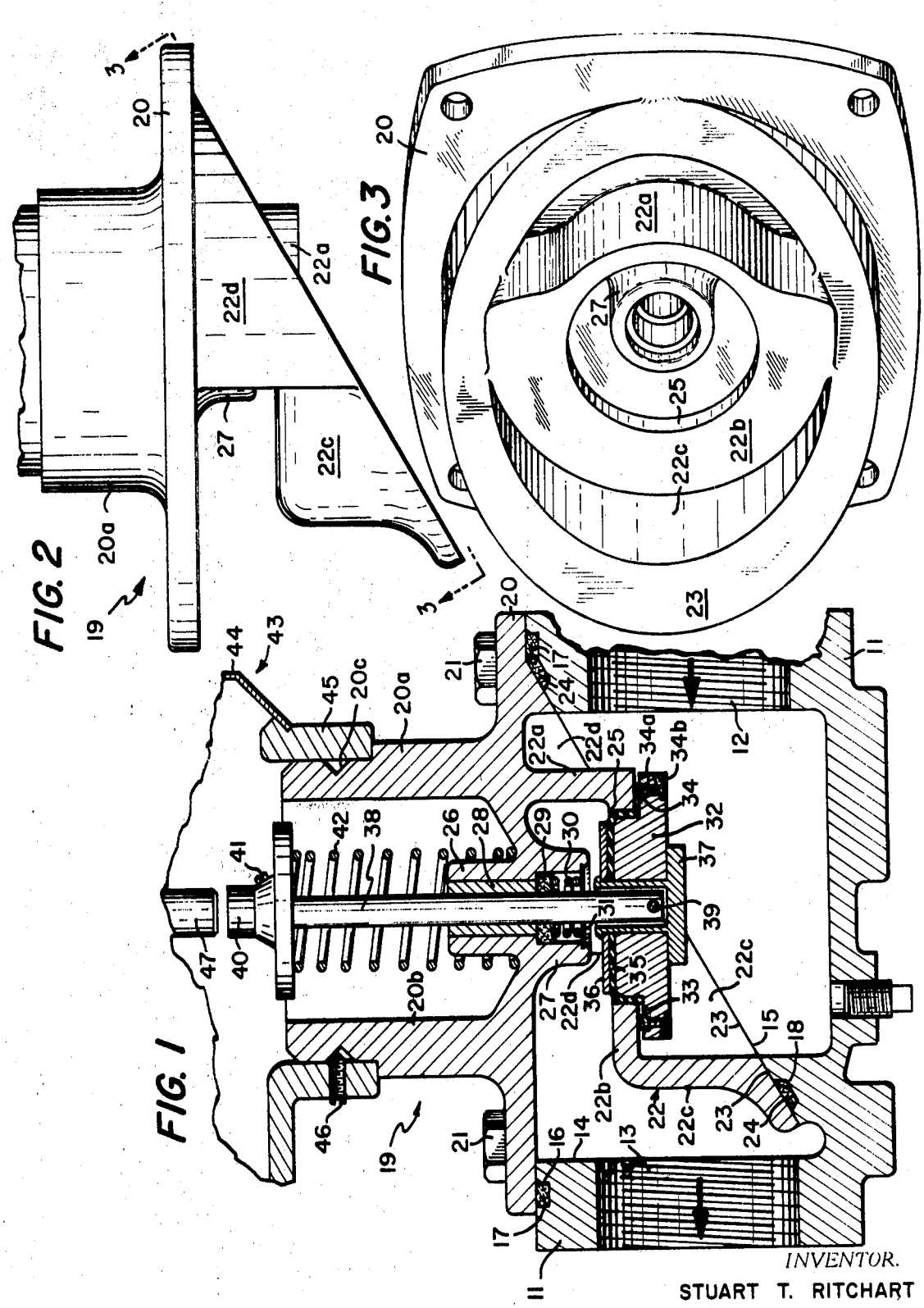

MOTORIZED VALVE OF GLOBE-TYPE

Motorized valves with a detachable motor mounted on the valve are generally well-known in the art so this invention is directed to improvements in a valve of this type. These improvements are shown in the drawing in which:

FIG. 1 is a vertical sectional view through the valve body with substantially all of the motor for operating the valve broken away;

FIG. 2 is a side elevational view of the walls of the valve and seat assembly; and FIG. 3 is a bottom view of the walls of the valve and seat assembly, taken in the direction indicated by line 3—3 of FIG. 2.

The valve body 11 has a threaded inlet 12, a threaded outlet 13, a side opening 14 and an inclined shoulder 15 extending from the bottom of the valve body at the outlet 13 and around the inner wall thereof to the top of the valve body at the inlet 12. This shoulder is generally oval in shape, is preferably flat and lies in a single plane. The top of the valve body provides a substantially round opening 14 with an annular groove 16 for the reception of an O-ring or other suitable seal 17. The inclined shoulder 15 also has a generally oval-shaped groove 18 therein which may or may not join with the annular groove 16 in the top surface of the valve body at the inlet end of the valve body.

A combined valve seat and valve assembly, generally designated by reference numeral 19, has a generally rectangular base portion 20 that is adapted to engage the top surface of the valve body 11 and sealingly engage the O-ring 17. It is adapted to be clamped to the valve body by means of bolts 21. Extending downwardly from the portion 20 is a saddle 22 that has a generally oval-shape bottom surface 23 which is adapted to rest against the correspondingly shaped surface or shoulder 15 and sealingly engage an O-ring 24. The saddle includes a generally vertically-extending and arcuate wall portion 22a extending downwardly from the portion 20, a partition wall portion 22b generally parallel with the axis of the inlet and the outlet, and a second vertically-extending and arcuate portion 22c near the outlet of the valve body. The two portions 22a and 22c are connected by the portion 22b and by an extension 22d of portion 22b. The wall portions 22c and 22d have the edges that provide the oval surface and the portion 22b has a bore 25 extending therethrough and the underside thereof is suitably finished to provide a valve seat. Located at the center of the body portion 20 is an upwardly extending tubular portion 26 and a downwardly extending and larger diameter tubular portion 27 which carry a bearing sleeve 28 and a packing washer 29, respectively. A coil compression spring 30 extends between a washer 31 and the packing washer, the washer 31 being staked in the lower end of the tubular portion 27.

A disc-type of valve 32 has an annular notch 33 therein which provides a shoulder for a rubber washer 34 to rest thereon for sealing engagement with the underside of the valve seat portion 22b. The rubber washer fits in an annular groove in the notch 33 and is held therein by means of molded pins 34a and heads or ring 34b. Extending across the top portion of the disc 32 and downwardly and around the periphery of that portion, is a flexible cup-shaped washer 35 that sealingly engages the walls of the opening 25. A backing washer 36 rests on the upper surface of the cup-shaped member and the disc 32, member 35 and washer 36 are held assembled by means of a tubular rivet 37. A valve stem 38, of a smaller diameter than the inner diameter of the rivet 37, is pivoted to the valve disc 32 by means of a pivot 39 extending transversely through the stem and the rivet. Secured to the upper end of the stem 38, is a head member 40 which is held on the stem 38 by means of a setscrew 41. A coil spring 42 extends from the body portion 20 to the head member 40 to normally bias the valve disc 32 into seating engagement with the valve seat portion 22b, with the cup-shaped member 35 engaging the opening 25.

The power unit, generally designated by the reference numeral 43, may be of any suitable type and has a housing 44 secured to a mounting ring 45 which, in turn, is shaped to fit on the valve and seat assembly. For this purpose, the valve portion 20 has an upwardly extending tubular portion 20a that surrounds the spring 42 and has an annular V-shaped groove 20c for the reception of a setscrew 46 extending through the portion 45. It will be noted that the setscrew engages the upper surface of the V-shaped notch 20c to wedge the mounting ring 45 tightly against the shoulder provided by the portions 20a and 20b, to thus hold the power unit 43 on the valve assembly. The actuator for the valve, which is movable upwardly and downwardly to engage the valve stem 40, is designated by the reference numeral 47.

From the above description, it may readily be seen that the combined valve seat and valve assembly may be easily assembled or disassembled from the valve body by a mere removal of the clamping bolts 21 and the insertion or removal of the unit out of the opening 14 in the top of the valve body. It will also be apparent that the flow of fluid through the valve body takes place with a minimum of pressure loss due to the fact that the arcuate wall portions 22a and 22c provide a minimum of resistance to fluid flow by helping to direct the flow to the opening 25 through the valve seat portion 22b and from that portion to the outlet 13. It will also be noted that due to the fact that the cup-shaped portion 35 will seat first when the valve is moved from an open position to a closed position, followed by the seating of the sealing ring 34, the assembly provides a double seal which permits the use of a valve condition indicator with less exacting manufacturing requirements. In other words, an indicator may be actuated at any position between the position wherein the cup-shaped member seals in the opening 25 and the position where the ring 34 engages its seat, which provides maximum manufacturing tolerance for the indicator to register that the valve is open or closed.

By making the saddle periphery and the cooperating shoulder in the valve body at an inclination to the axis of the valve inlet and outlet, the walls of the saddle of the supporting closure may be cast as an integral unit, which not only makes the cost thereof less but also assures proper alignment of the motor, valve and seat.

I claim:

1. A fluid flow control valve comprising a valve body having an inlet and an outlet and a side opening, the inner wall of said valve body having an oval-shaped and inclined shoulder extending completely around the axes of said inlet and outlet, a one-piece saddle having a closure wall for substantially closing said opening and a partition wall having a valve seat around an aperture therein and coaxial with said side opening, said saddle also having a periphery of complimentary shape to said shoulder so that when the saddle is seated on said shoulder the saddle separates said inlet from said outlet, said partition wall having an intermediate valve seat portion lying in a plane parallel to the axes of said inlet and outlet and said closure wall being shaped to removably overlie and sealingly engage said valve body around said side opening, said closure wall also having an opening therethrough and means for mounting a valve actuating means thereon, and a valve positioned to engage said valve seat and to be actuated by the valve actuating means.

2. A valve as defined in claim 1 wherein said partition wall has an arcuate portion on each of the inlet and outlet sides of said valve seat portion and at right angles thereto and generally in line with said inlet and said outlet, respectively.

3. A valve as defined in claim 1 wherein said valve has a piston-shaped portion positioned to sealingly engage the wall of said aperture and a disc-shaped portion positioned to engage said valve seat portion around said aperture after the aperture has been closed by said piston-shaped portion and after the valve has moved an additional distance in the valve closing direction.

4. A valve as defined in claim 3 wherein said piston-shaped portion has a flexible seal around its periphery.

5. A valve as defined in claim 1 wherein said outlet is substantially coaxial with said inlet and said inclined shoulder lies in a plane intersecting the axes of said inlet and outlet at an angle less than 45 .